No. 808,623. PATENTED JAN. 2, 1906.
B. C. BATCHELLER.
CARRIER FOR PNEUMATIC TUBES.
APPLICATION FILED MAR. 21, 1905.

WITNESSES:

INVENTOR
Birney C. Batcheller
BY
ATTORNEY.

UNITED STATES PATENT OFFICE.

BIRNEY C. BATCHELLER, OF PHILADELPHIA, PENNSYLVANIA, ASSIGNOR TO THE PEARSALL PNEUMATIC TUBE AND POWER COMPANY, OF NEW YORK, N. Y., A CORPORATION OF NEW YORK.

CARRIER FOR PNEUMATIC TUBES.

No. 808,623.     Specification of Letters Patent.     Patented Jan. 2, 1906.

Application filed March 21, 1905. Serial No. 251,210.

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Carriers for Pneumatic Tubes, of which the following is a true and exact description, reference being had to the accompanying drawings, which form a part thereof.

My invention relates to carriers such as are used in connection with pneumatic tubes, and has for its object to provide a carrier with appliances adapted to make a practically airtight joint with the tube irrespective of the direction in which the carrier is inserted in the tube; and my invention consists in providing a carrier with a thin elastic disk of india-rubber or other suitable material of greater diameter than the tube in which the carrier is used and which is perfectly free on its edges to curve in either direction when inserted into a tube, so as to form, in effect, a cup-packing in connection with the tube.

Reference is now had to the drawings, which illustrate a carrier provided with my improvement, and in which—

Figure 1:
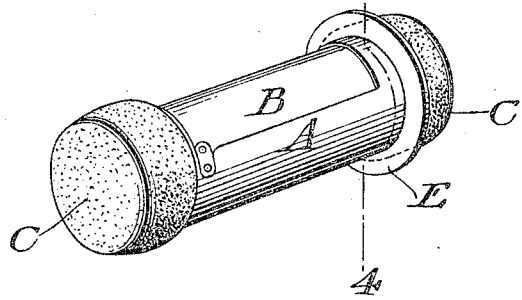
Figure 2:
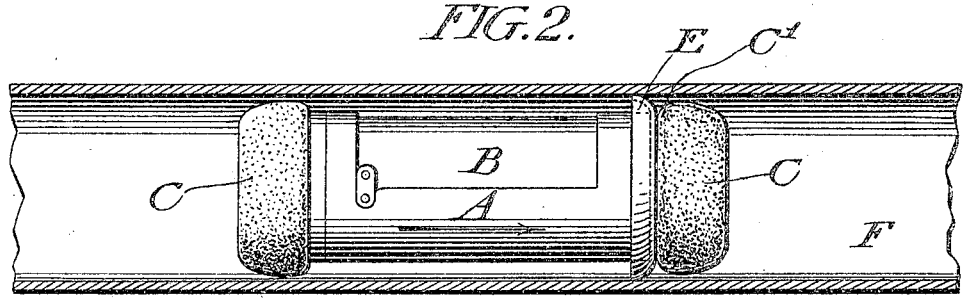
Figure 3:
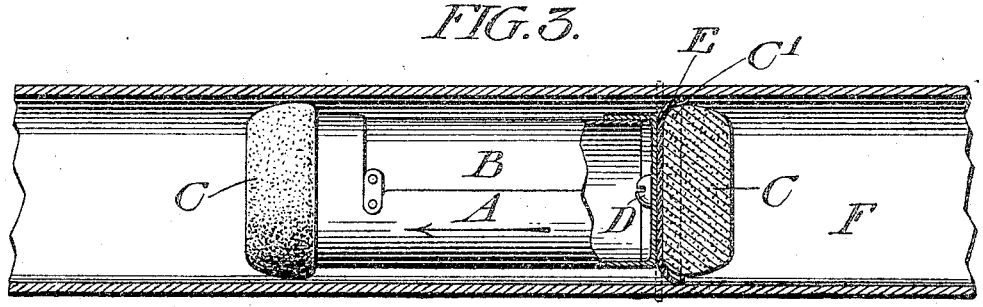
Figure 4:
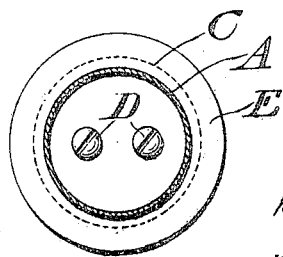

Figure 1 is a perspective view of a carrier; Fig. 2, a longitudinal section of the tube, showing the carrier situated within the tube and moving toward the right; Fig. 3, a similar view to Fig. 2, showing the carrier moving toward the left and showing one end of the carrier with its buffer and elastic disk in section; and Fig. 4 is a cross-sectional view on the line 4 4 of Fig. 1.

A indicates the carrier-cylinder, and B the gate or closure for the cylinder, while C C indicate the buffers with which the carrier is provided at both ends and which are generally made of heavy felt.

D D indicate screws by which the buffers are held in place.

E indicates the thin elastic rubber disk, which is preferably secured to the carrier, as shown, by being placed between it and one of its felt buffers, the edges of the disk projecting beyond the carrier and buffer, so as to engage with the walls of the tube when the carrier is inserted therein. In order to enable the disk edge to curve freely outward over the buffer, the edge C' of the buffer (see Figs. 2 and 3) should be cut away or curved, so as not to interfere with the turning outward of the disk edge.

In Fig. 2 the carrier is represented as moving toward the right, the disk E forming a cup-packing curving inward over the cylinder, and in Fig. 3 the carrier is represented as moving toward the left, with the disk edge curving outward over the buffer. The light elastic character of the disk enables it to turn freely in either direction and to conform closely to the conformation of the tube, so that in whichever direction the carrier is traveling a practically tight joint is provided, which prevents the escape of air past the carrier and at the same time with practical absence of friction, which would tend to retard the carrier.

Having now described my invention, what I claim as new, and desire to secure by Letters Patent, is—

1. A pneumatic carrier having buffer-heads at its ends and a flat flexible disk of greater diameter than the buffers or than the tube in which the carrier is to travel, secured between one end of the carrier and the buffer at that end.

2. A pneumatic carrier having buffer-heads at its ends and a flat flexible disk of greater diameter than the buffers or than the tube in which the carrier is to travel secured between one end of the carrier and the buffer at that end, said buffer being rounded at C', to permit the edge of the disk to turn freely over it.

BIRNEY C. BATCHELLER.

Witnesses:
   CHAS. F. MYERS,
   D. STEWART.